United States Patent
Liu et al.

Patent Number: 6,052,277
Date of Patent: Apr. 18, 2000

[54] COMPUTER ENCLOSURE

[75] Inventors: Alvin Liu, Taipei Hsien; I-Fee Chen, Chung-Li, both of Taiwan

[73] Assignee: Hon Hai Precision Ind. Co., Ltd., Taipei Hsien, Taiwan

[21] Appl. No.: 09/034,179

[22] Filed: Mar. 3, 1998

[30] Foreign Application Priority Data

Mar. 3, 1997 [TW] Taiwan ................................ 86203408

[51] Int. Cl.[7] ........................................................ G06F 1/16
[52] U.S. Cl. .......................... 361/685; 361/725; 312/223.2
[58] Field of Search ................................... 361/685, 724, 361/725, 727; 312/223.2

[56] References Cited

U.S. PATENT DOCUMENTS

| | | | |
|---|---|---|---|
| 5,124,885 | 6/1992 | Liu | 361/724 |
| 5,398,161 | 3/1995 | Roy | 361/685 |
| 5,513,068 | 4/1996 | Girard | 361/685 |
| 5,661,640 | 8/1997 | Mills et al. | 361/801 |
| 5,691,879 | 11/1997 | Lopez et al. | 361/685 |
| 5,726,864 | 3/1998 | Copeland et al. | 361/685 |
| 5,761,030 | 6/1998 | Roscoe | 361/685 |
| 5,768,099 | 6/1998 | Radloff et al. | 361/685 |
| 5,828,547 | 10/1998 | Francovich et al. | 361/685 |

*Primary Examiner*—Leo P. Picard
*Assistant Examiner*—John D. Reed

[57] ABSTRACT

A computer enclosure comprises a base frame, a mounting bracket, and a top cover. The base frame has a base panel, a front panel, a rear panel for mounting connectors and a power supply thereto, and a plate dividing the base frame into a first space for receiving and mounting a mother board on the base panel and a second space for containing and fixing other components such as a switching power supply, a floppy disk drive, or a CD ROM. The mounting bracket receives a hard disk therein and can be mounted in either the first space or second space. Alternatively, two mounting brackets can be mounted in both spaces, respectively. The mounting bracket is hooked onto the plate and fastened onto the front or rear panel with one screw. The base frame has a stopper located between the front and rear panels and pivotably mounted to the base panel. The mother board smoothly slides into the first space without obstruction by engaging the stopper the base frame.

8 Claims, 4 Drawing Sheets

COMPUTER ENCLOSURE

BACKGROUND OF THE INVENTION

1. Field of the Invention

The present invention relates to a computer enclosure, and particularly to a computer enclosure which receives a horizontally mounted mother board and has suspended brackets for mounting hard disks therein for facilitating the assembly of components within the enclosure.

2. The Related Art

A computer enclosure receives many different components such as a mother board, a hard disk, a floppy disk drive, a switching power supply, etc. The mother board can be positioned within the enclosure in a variety of ways. As disclosed in U.S. Pat. No. 5,124,885, the mother board is fixed on a tray as a subassembly before being mounted within the computer enclosure. Modularizing the mother board can be effective but is time and cost inefficient. Mounting the mother board on a tray will lengthen the manufacture and assembly process thereof as well as require additional fastening means. In U.S. Pat. Nos. 5,164,886, and 5,175,670, the mother board is directly mounted to the computer enclosure by means of a plurality of screws which becomes laborious. A different method of assembly utilizes tunnel-shaped rails protruding from the enclosure structure for slidably receiving and fixing the mother board. A front edge of the mother board requires precise alignment with the end opening of the rails before sliding the mother board to the desired location which becomes tedious.

Furthermore, most components of the computer have been mounted in predetermined positions before the mother board is received therein. Conventional computer enclosures disclosed in the patents described above and in U.S. Pat. Nos. 5,306,079 and 5,438,476 require the use of many screws to assemble the switching power supply, hard disk, and other parts or subsystems which becomes laborious and increases manufacturing costs. Therefore, an improved computer enclosure is required which can facilitate the assembly of the components within the enclosure.

SUMMARY OF THE INVENTION

In view of the foregoing, an object of the present invention is to provide an improved computer enclosure which allows a mother board to be easily mounted therein.

Another object of the present invention is to provide an improved computer enclosure which requires only one screw to fix a suspended bracket for mounting a hard disk therein.

To achieve the above objects, an improved computer enclosure in accordance with the present invention comprises a base frame, a mounting bracket, and a top cover. The base frame has a base panel, a front panel, a rear panel for mounting connectors and a power supply thereto, and a plate dividing the base frame into a first space for receiving and mounting a mother board on the base panel and a second space for containing and fixing other components such as a switching power supply, a floppy disk drive, or a CD ROM. The mounting bracket receives a hard disk therein and can be mounted in either the first space or the second space. Alternatively, two mounting bracket can be mounted in both spaces, respectively. The mounting bracket is hooked onto the plate and fastened onto the front or rear panel with one screw. The base frame has a stopper located between the front and rear panels and pivotably mounted to the base panel. The mother board smoothly slides into the first space without obstruction by engaging the stopper with the base frame.

DETAILED DESCRIPTION OF THE PREFERRED EMBODIMENTS

References will now be made in detail to the preferred embodiments of the present invention.

Figure 1:
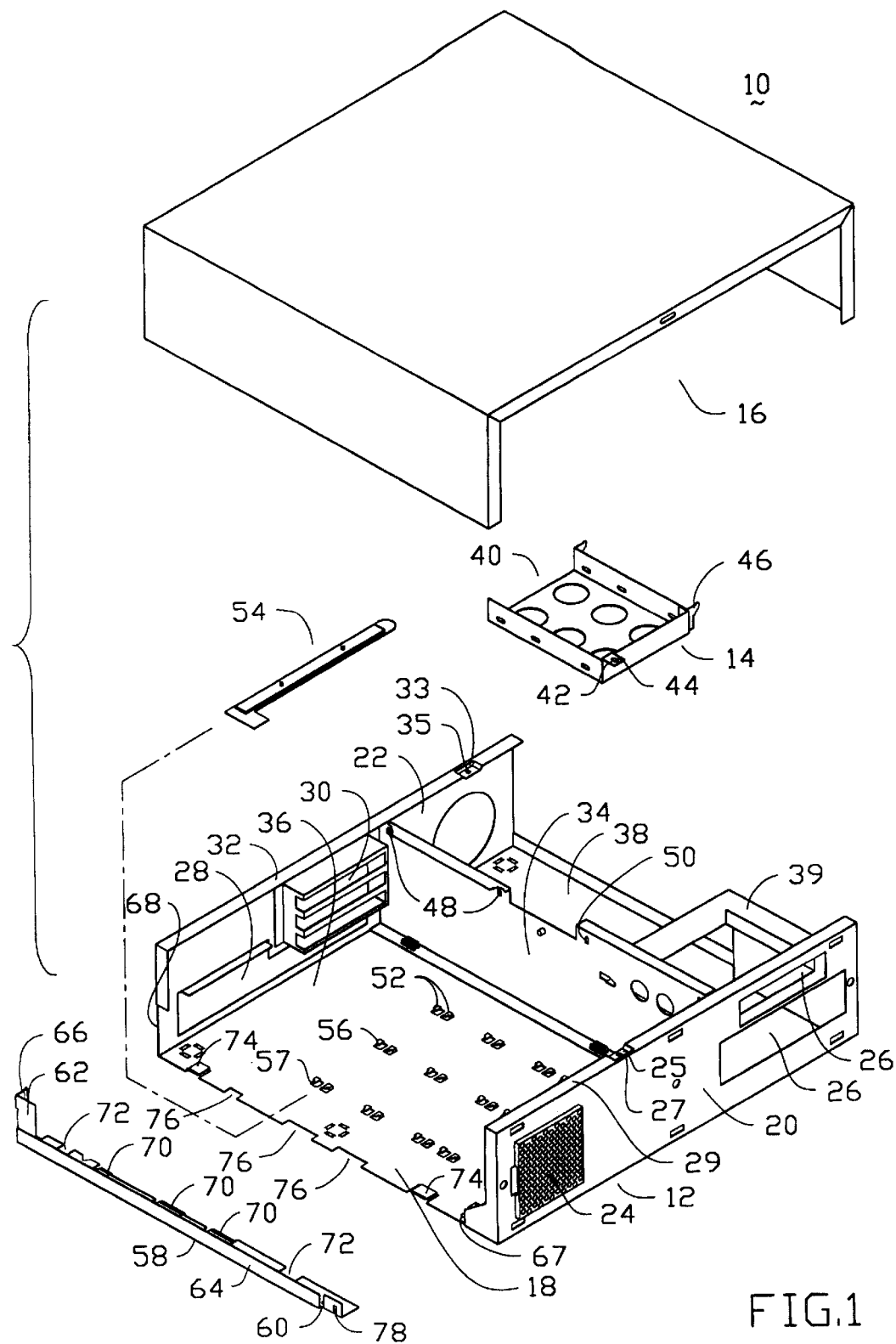
FIG. 1 is an exploded view of a preferred embodiment of a computer enclosure in accordance with the present invention.

Referring to FIG. 1, a computer enclosure 10 includes a base frame 12, a mounting bracket 14, and a top cover 16. The U-shaped base frame 12 comprises a base panel 18 for mounting a mother board (not shown) thereto, a front panel 20, and a rear panel 22. The front panel 20 is perpendicular to the base panel 18 and forms a plurality of vent holes 24 for dissipating heat generated by a CPU (not shown), openings 26 for receiving floppy disks or a CD ROM, and a flange 29 for reinforcing the structure of the front panel 20. The flange 29 defines a recess 25 with a hole 27 therein for fixing the mounting bracket 14 thereto. The rear panel 22 is also perpendicular to the base panel 18 and forms an I/O area 28 for receiving connectors, slots 30 for fixing expansion cards (not shown) thereto, and a flange 32 for strengthening the structure of the rear panel 22. The flange 32 defines a recess 33 with a hole 35 therein for fixing the mounting bracket 14 thereto. The front panel 20 and the rear panel 22 are respectively and perpendicularly joined to the base panel 18 at opposite ends thereof. A plate 34 is mounted between the front panel 20 and the rear panel 22. Together with the base frame 12, the plate 34 defines a first space 36 for receiving a mother board and a second space 38 for receiving a switching power supply (not shown) and a drive cage 39 for insertion of a floppy disk (not shown) and a CD ROM (not shown) therein.

Figure 2:
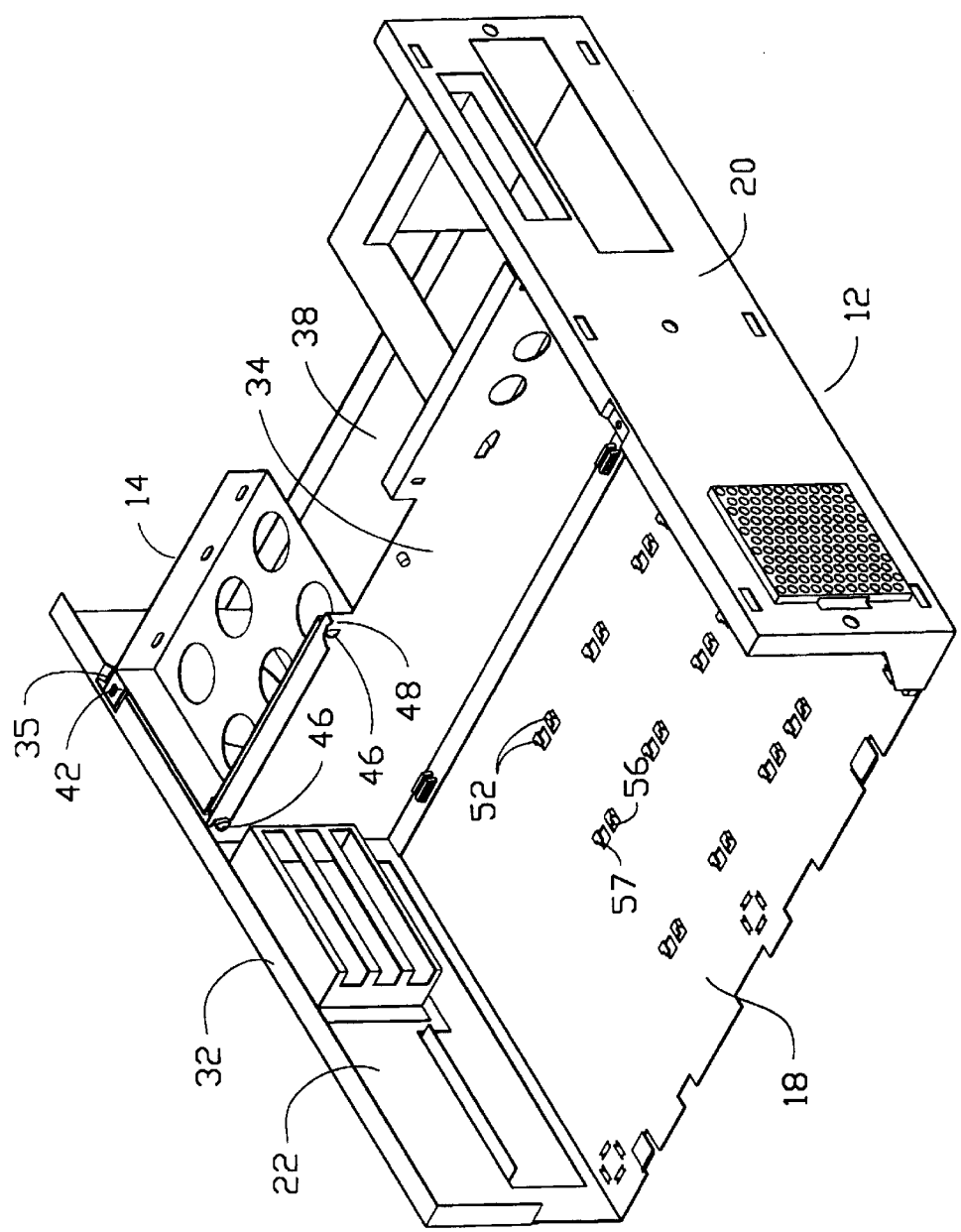
FIG. 2 is a perspective view of the preferred embodiment of the computer enclosure in accordance with the present invention showing a base frame and a mounting bracket at a first location.
Figure 3:
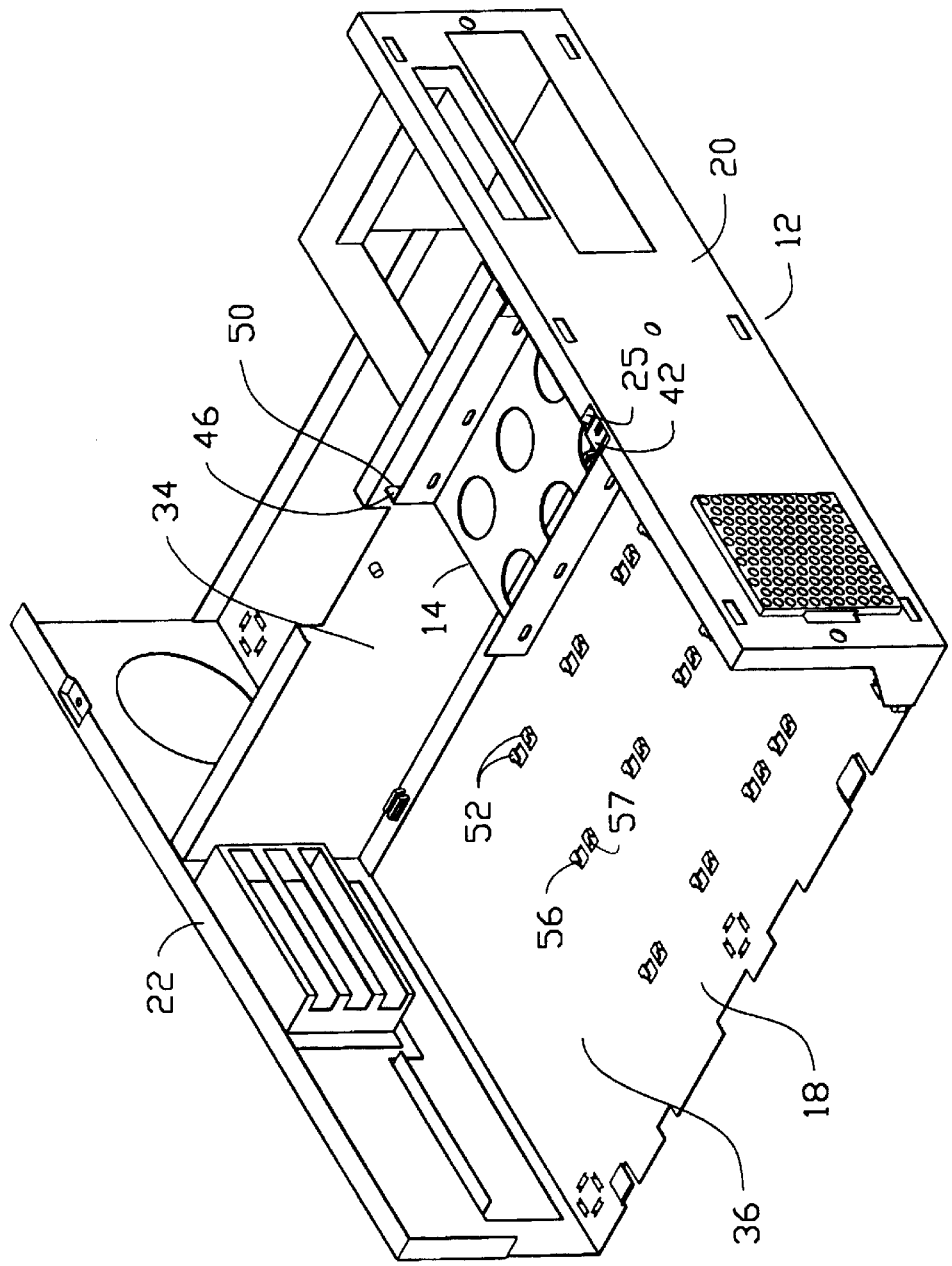
FIG. 3 is a perspective view of the preferred embodiment of the computer enclosure in accordance with the present invention showing the base frame and the mounting bracket at a second location.

The mounting bracket 14 is a rectangular tray having an open side 40 for slidably receiving a hard disk therein, a tab 42 projecting outward from a lateral side and defining a hole 44 therein, and two L-shaped hooks 46 extending from opposite ends of a longitudinal side, respectively. The mounting bracket 14 may be mounted within either the first space 36 or the second space 38. Alternatively, two mounting brackets 14 can be mounted in both spaces, respectively. As shown in FIG. 2, the mounting bracket 14 is positioned in the second space 38 by respectively inserting the L-shaped hooks 46 into holes 48 defined in the plate 34 and threadedly engaging a screw (not shown) with the hole 44 of the tab 42 and the hole 35 of the recess 33. As shown in FIG. 3, the mounting bracket 14 is positioned in the first space 36 by respectively inserting the L-shaped hooks 46 into holes 50 defined in the plate 34 and securing the tab 42 onto the recess 25 by means of a screw (not shown) as described above.

Referring back to FIG. 1, in the first space 36 of the base frame 12, the base panel 18 forms pairs of protrusions 52 aligned in rows for slidably receiving rails 54 mounted on a bottom surface of the mother board (not shown). Each row of paired protrusions 52 defines a channel for receiving one of the rails 54, and each pair of protrusion 52 forms a leading tab 56 on each upper portion thereof projecting toward each other for guiding the rail 54 through the channel. Furthermore, each leading tab 56 forms a finger 57 projecting opposite the direction of mother board insertion for more precisely and easily guiding the rail 54 through the channel. A stopper 58 formed by folding an elongate metal sheet includes a horizontal portion 64 forming a plurality of tongues 70 and recesses 72 for securely engaging with corresponding recesses 76 and tongues 74 formed on a side of the base panel 18, and a vertical portion 62 formed at an end of the horizontal portion 64 and having a strip 66 for abutting against an outer surface 68 of the rear panel 22. A hole 60 is defined in a lateral end of the horizontal portion opposite the vertical portion 62 for receiving a trunnion 67 formed on an edge of the base frame 12 thereby pivotably mounting the stopper 58 to the base frame 12. The lateral end of the horizontal portion 64 opposite the vertical portion 62 further defines a cutout 78 therein for engaging with a hook (not shown) formed on the base frame 18.

Figure 4:
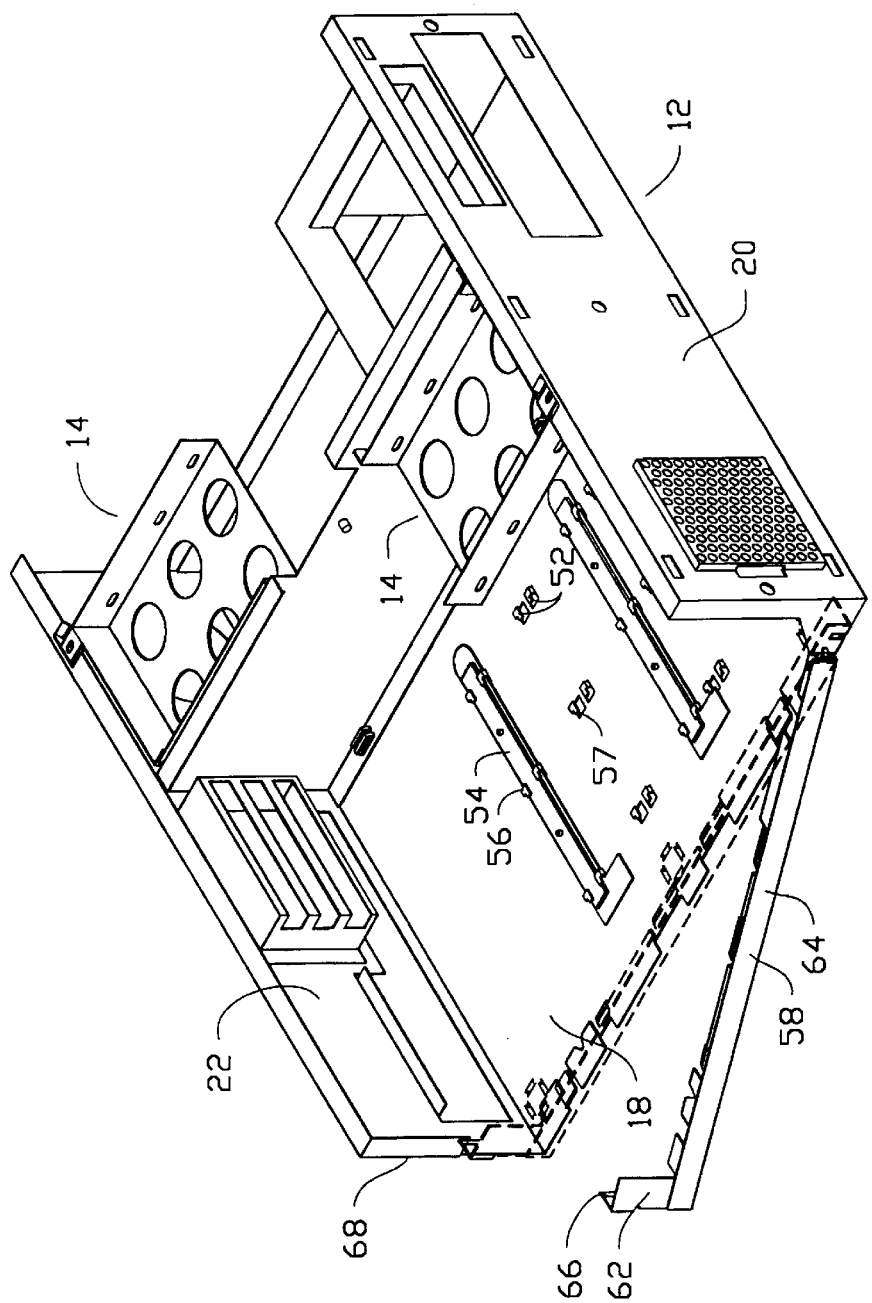
FIG. 4 is a perspective view of the preferred embodiment of the computer enclosure in accordance with the present invention showing a stopper pivotally mounted on a side of the base frame and the mounting bracket at both first and second locations.

As shown in FIG. 4, the stopper 58 is disengaged from the base frame 12 and the mother board (not shown) together with the rails 54 mounted thereto is slidably mounted on the base panel 18 whereby the rails 54 are smoothly received in the channels formed by the rows of paired protrusions 52. The stopper 58 is then pivoted to fixedly engage with the base frame 12 (as shown in phantom lines), whereby the strip 66 firmly abuts against an outer surface 68 of the rear panel 22 for securing the vertical portion 62, the tongues 70 and the recesses 72 of the stopper 58 engage with the respective recesses 76 and tongues 74 of the base panel 18 for securing the horizontal portion 64, and the hook of the base panel 18 is received in the cutout 78 of the stopper 58.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. A computer enclosure selectively fixing a hard disk drive with one screw at two positions therein, comprising:
   a base frame having a base panel mounting a mother board thereto and two parallel side panels facing to each other and perpendicular to said panel;
   a plate mounted between said side panels and defining a first space and a second space with the base frame;
   a mounting bracket selectively mounted in at least one of said first and second spaces for retaining said hard disk, the hard disk drive having a longitudinal side mounted to said plate and a lateral side perpendicular to the longitudinal side supported on one of said side panels; and
   a top cover assembled with said base frame.

2. The computer enclosure as described in claim 1, wherein said mounting bracket has hooks respectively formed on opposite ends of said longitudinal side, said hooks extending through corresponding holes defined in said plate and hanging said mounting bracket on said plate.

3. The computer enclosure as described in claim 2, wherein said hooks are L-shaped.

4. The computer enclosure as described in claim 1, wherein each said side panel forms a flange defining a recess, and said recess further defines a first hole therein.

5. The computer enclosure as described in claim 4, wherein said mounting bracket has a tab projecting from said lateral side and received in said recess of one of said side panels in which a second hole is further defined and aligns with said first hole of said recess and a screw theadedly engages with said first hole and said second hole.

6. A computer enclosure for receiving a mother board therein, comprising:
   a base frame having a base panel slidably receiving said mother board, a front panel perpendicular to said base panel, and a rear panel opposite said front panel and perpendicular to said base panel;
   at least one rail mounted to a bottom surface of said mother board;
   a plurality of pairs of protrusions with leading tabs formed on said base panel, aligned in rows, and defining a tunnel-liked passage for slidably receiving said rail therethrough, and said leading tab gripping said rail; and
   a top cover assembled with said base frame.

7. The computer enclosure as described in claim 6, further comprising a finger formed on each said leading tab projecting toward the direction of mother board insertion.

8. A computer enclosure selectively fixing a hard disk drive with one screw at two positions therein, comprising:
   a base frame having a base panel mounting a mother board thereto and two opposite side panels perpendicular to said base panel;
   a plate mounted between said opposite panels and defining a first space and a second space with the base frame;
   a mounting bracket receiving a hard disk and having one longitudinal side mounted on said plate and one lateral side perpendicular to the longitudinal side and supported on said side panel; and
   a top cover assembled with said base frame; wherein
   each of said side panels forms a flange defining a recess, said recess further defining a first hole therein, and said mounting bracket has a tab projecting from said lateral side and received in said recess of one of said side panels in which a second hole is further defined and aligns with said first hole of said recess and a screw threadedly engages with said first hole and said second hole.

* * * * *